3,337,528
METHOD OF PREPARING INOSINE OR DERIVATIVE THEREOF
Tadaomi Saito, Akihiro Yamazaki, Takashi Meguro, and Izumi Kumashiro, Kanagawa-ken, and Tadao Takenishi, Tokyo, Japan, assignors to Ajinomoto Co., Inc., Tokyo, Japan
No Drawing. Filed Apr. 14, 1965, Ser. No. 447,982
Claims priority, application Japan, Apr. 16, 1964, 39/21,230
5 Claims. (Cl. 260—211.5)

This invention relates to a novel method of synthesizing inosine or derivatives thereof.

Inosine has important uses in the field of pharmacology, and the sodium salt of inosine-5'-phosphate has a pleasant taste and is a seasoning agent.

We have found that inosine or derivatives thereof can be prepared in very high yield when 5-amino-4-carbamoyl-1-$\beta$-D-ribofuranosyl imidazole, hereinafter termed AICAR, or a derivative of AICAR is reacted with alkyl orthoformate or alkyl orthoacetate.

The reaction of the present invention may be represented as follows:

[Chemical structures: (I) AICAR derivative + $R_3C(OR_4)_3$ → (II) inosine derivative]

$R_1$ and $R_2$ each represent hydrogen or an isopropylidene group, $R_4$ is an alkyl group, and $R_3$ is hydrogen or a methyl group.

The starting material AICAR can be prepared by fermentation (Shiro et al., J. Agricultural and Biological Chemistry of Japan 26, 1962), or by chemical synthesis (E. Shaw et al., J. Chem. Soc. 1959, 1648; J. Amer. Chem. Soc. 80 3899, 1958).

A particular derivative of AICAR which may be employed, is 5-amino-4-carbamoyl-1-(2',3'-O-isopropylidene-$\beta$-ribofuranosyl) imidazole, hereinafter termed Ip-AICAR (G Shaw et al., J. Chem. Soc. 2650, 1964). Ip-AICAR may be prepared more easily from AICAR by treating the AICAR with acetone in the presence of an acid or Lewis acid.

Examples of alkyl orthoformates and alkyl orthoacetates which can be used in the present invention are trialkylesters of orthoformic acid and orthoacetic acid in which the alkyl group is methyl, ethyl, propyl or butyl. The amount of alkyl orthoformate or alkyl orthoacetate which is used is generally more than one mole per mole of AICAR.

The reaction of the invention may be carried out at a temperature in the range of from about 30° C. to the boiling point of the reaction system, and is generally carried out under reflux. Although the time required for the reaction to be completed varies with the amount of reactants and the reaction temperature, generally about 30 minutes to 12 hours is required. The reaction between AICAR or Ip-AICAR and alkyl orthoformate or alkyl orthoacetate proceeds readily in a solvent for the AICAR or Ip-AICAR, which is inert to the reactants and the product, suitable solvents include lower alkanols, such as methanol or ethanol; cyclic ether, such as dioxane, and other solvents, such as N,N-dimethylformamide, dimethylsulfoxide, formamide or 2,2-dialkoxylpropane. The reaction also proceeds readily in a presence of a dehydrating agent. Examples of useful dehydrating agents are carboxylic acid anhydride, such as acetic anhydride, and molecular sieves.

We also have found that inosine and derivatives thereof can be obtained in higher yield when an acid, Lewis acid or phosphorus chloride is present in the reaction system. The reaction proceeds preferably at a temperature of from —5 to 10° C.

Examples of acids which can be used are hydrogen chloride, p-toluenesulfonic acid, formic acid and acetic acid. Lewis acids are metal halides, such as aluminum chloride or zinc chloride. Phosphorus chlorides are phosphorus trichloride, phosphorus pentachloride, phosphorus oxychloride. Polyphosphate can also be used.

The product of the method of the invention may be isolated from the reaction mixture by an conventional method. For example, inorganic salts and dehydrating agents are removed from the reaction mixture, the resultant solution is concentrated under reduced pressure, and the residue obtained is recrystallized out to precipitate the end product from water, acetone or ethanol.

For the identification of the end product such conventional methods may be used as measurement of ultraviolet and infrared absorption spectra, or paper chromatography.

*Example 1*

0.1 g. of AICAR and 5 ml. of ethyl orthoformate were heated under reflux for 6 hours.

The yield of inosine was measured by paper chromatography using an n-propanol-concentrated ammonia-water-20:12:3 (v./v.) solvent system and was found to be 53%.

*Example 2*

A mixture of 1.0 of Ip-AICAR, 35 ml. of ethyl orthoformate and 1 ml. of acetic anhydride was heated under reflux for 4 hours. The reaction mixture was concentrated under reduced pressure, the residue was dissolved in concentrated ammonia, and the ammonia solution was concentrated under reduced pressure to precipitate out crude crystalline 2',3'-O-isopropylidene inosine. The crude crystals weighed 1.08 g. (98%). The crystals were recrystallized from ethanol to give 0.90 g. of pure crystals, which melted and decomposed at 175° C. An elementary analysis, ultraviolet and infrared absorption spectra were in excellent agreement with those published for 2',3'-O-isopropylidene inosine.

*Example 3*

A mixture of 2 g. of Ip-AICAR and 19 ml. of ethyl orthoacetate was heated under reflux for 3 hours. The reaction mixture was concentrated under reduced pressure to precipitate out crude 2',3'-O-isopropylidene-2-methyl inosine.

A single spot was detected on a paper chromatogram of the crystal by the same solvent as in Example 1. The crude crystals were recrystallized from ethanol to give 0.8 g. of pure crystals, representing a yield of 50 percent. The crystals melted and decomposed at 226–230° C.

An elementary analysis of the crystal was as follows: Found: C, 52.1%; H, 6.4%; N, 17.3%. Calculated for $C_{14}H_{16}O_5N_4$: C, 52.5%; H, 5.0%; N, 17.3%.

Ultraviolet absorption spectra of the crystals showed $\lambda_{max}$ at 252 m$\mu$ at pH 1 and $\lambda_{max}$ at 258 m$\mu$ at pH 13.

*Example 4*

0.298 g. of Ip-AICAR was dissolved in N,N-dimethyl formamide, 20 ml. of ethyl orthoformate was added to the solution, and 10 ml. of ethanol containing 3.0 g. of dried hydrogen chloride was poured in dropwise into the mixture with stirring.

The reaction solution was kept for 4 hours at room temperature, poured in ice water and the aqueous solution was filled up to 10 milliliters. The solution was spotted on a filter paper, and the spot was developed with the same solvent as in Example 1. A spot of $R_f$ value 0.45 was eluted with 0.1 N-HCl solution, the yield of 2′,3′-O-isopropylidene inosine was determined by measuring light absorbency at 250 m$\mu$ and was found to be 70%.

The aqueous solution of the reaction mixture was concentrated under reduced pressure to dryness and crude crystalline 2′,3′-O-isopropylidene inosine was obtained in the amount of 0.17 g. (54%). The crude crystals were recrystallized from ethanol, and the pure crystals obtained melted and decomposed at 274° C.

Figures of ultraviolet and infrared absorption spectra of the pure crystals fully agreed with those published.

Example 5

AICAR and Ip-AICAR were treated with alkyl orthoformate or alkyl orthoacetate under various conditions, in the same procedure as in Example 4. The yield of the end product was measured in a similar procedure to that of Example 1. The results were listed in the following Table I.

wherein $R_1$ and $R_2$ each represent a radical selected from the group consisting of hydrogen and an isopropylidene group, $R_3$ is a radical selected from the group consisting of hydrogen and methyl group, which comprises reacting an imidazole selected from the group consisting of 5-amino-4-carbamoyl-1-$\beta$-D-ribofuranosyl imidazole and 5-amino-4-carbamoyl-1-(2′,3′-O - isopropylidene - $\beta$ - D-ribofuranosyl) imidazole with a substance selected from the group consisting of a lower alkyl orthoformate and an alkyl orthoacetate, and recovering said compound from the reaction system.

2. A method as set forth in claim 1, wherein said reaction is carried out in the presence of an acid substance selected from the group consisting of an acid, Lewis acid and phosphorus chloride.

3. A method as set forth in claim 1, wherein said reaction is carried out at a temperature between about 30° C. and the boiling point of the reaction system.

4. A method as set forth in claim 1, wherein the reaction is carried out under reflux.

5. A method as set forth in claim 1, wherein the reaction is carried out in an inert solvent.

TABLE I

| Test No. | Material | Additives | | Conditions | | Yield of end product |
|---|---|---|---|---|---|---|
| | | Acid | Solvent | Temperature | Time | |
| 1 | AICAR, 0.26 g.; HC(OMe)₃, 40 ml | POCl₃, 2.0 g | Not added | 5° C | 5 hr | HxR, 40%. |
| 2 | AICAR, 0.26 g.; HC(OEt)₃, 40 ml | HCl | EtOH, 20 g | Room | 3 hr | HxR, 70%. |
| 3 | AICAR, 0.26 g.; HC(OMe)₃, 40 ml | AlCl₃, 10 g | Not added | do | 3 hr | HxR, 30%. |
| 4 | AICAR, 0.26 g.; HC(OMe)₃, 40 ml | p-Toluene sulfonic acid, 10 g. | do | do | 3 hr | HxR, 50%. |
| 5 | Ip-AICAR, 0.30 g.; HC(OMe)₃, 40 ml | PCl₃, 20 g | 2 PO(OMe)₃, 20 g | 5° C | 5 hr | Ip-HxR, 60%. |
| 6 | Ip-AICAR, 0.30 g.; HC(OMe)₃, 40 ml | PCl₅, 20 g | Not added | 5° C | 5 hr | Ip-HxR, 55%. |
| 7 | Ip-AICAR, 0.30 g.; HC(OMe)₃, 40 ml | POCl₃, 30 g | do | 5° C | 5 hr | Ip-HxR, 30%; HxR, 50%. |
| 8 | Ip-AICAR, 0.30 g.; HC(OMe)₃, 10 ml | POCl₃, 5 g | PO(Me)₃, 20 g | 5° C | 5 hr | Ip-HxR, 95%. |
| 9 | Ip-AICAR, 0.30 g.; HC(OMe)₃, 10 ml | POCl₃, 5g | Dioxane, 40 g | 5° C | 5 hr | Ip-HxR, 65%. |
| 10 | Ip-AICAR, 0.30 g.; HC(OMe)₃, 10 ml | POCl₃, 5 g | DFA, 40 g | 5° C | 5 hr | Ip-HxR, 70%. |
| 11 | Ip-AICAR, 0.30 g.; HC(OMe)₃, 10 ml | P₂O₅, 20 g | PO(OMe)₃, 20 g | 5° C | 5 hr | Ip-HxR, 50%; HxR, 20%. |
| 12 | Ip-AICAR, 0.30 g.; HC(OMe)₃, 40 ml | Formic acid, 20 g | Not added | 5° C | 4 hr | HxR, 60%. |
| 13 | Ip-AICAR, 0.30 g.; HC(OMe)₃, 40 ml | Acetic acid, 20 g | do | Reflux | 4 hr | Ip-HxR, 90%. |
| 14 | Ip-AICAR, 0.30 g.; HC(OMe)₃, 40 ml | AlCl₃, 10 g | do | Room | 5 hr | Ip-HxR, 52%. |
| 15 | Ip-AICAR, 0.30 g.; HC(OEt)₃, 40 ml | HCl | EtOH, 10 g | 5° C | 4 hr | HxR,* 80%. |
| 16 | Ip-AICAR, 0.30 g.; HC(OMe)₃, 5.0 ml | ZnCl₂, 20 g | PO(OMe)₃, 17 g | Room | 4 hr | Ip-HxR, 30%. |
| 17 | Ip-AICAR, 0.30 g.; HC(OEt)₃, 5.0 ml | HCl | EtOh, 3 g.; DFA, 40 g | do | 4 hr | Ip-HxR, 70%. |
| 18 | AICAR, 0.50 g.; CH₃C(OEt)₃, 4 ml | HCl | EtOh, 20 g | 5–10° C | 5 hr | Ip-Me-Hxr, 58%. |
| 19 | Ip-AICAR, 0.50 g.; CH₃C(OEt)₃, 4 ml | HCl | EtOH, 20 g | 5–10° C | 5 hr | Ip-Me-HxR, 54%. |
| 20 | Ip-AICAR, 0.5 g.; CH₃C(OEt)₃, 5 ml | POCl₃ | PO(OEt)₃ 10 g | 5–10° C | 5 hr | Ip-Me-HxR, 65%. |

NOTE.—HC(OMe)₃: Methyl orthoformate; HC(OEt)₃: Ethyl orthoformate; CH₃C(OEt)₃: Ethyl orthoacetate; PO(OMe)₃: Trimethyl phosphate; EtOH: Ethanol; DFA: Dimethyl formamide; HxR: Inosine; Ip-HxR: 2′,3′-O-isopropylidene inosine; Ip-Me-HxR: 2-methyl-2′,3′-O-isopropylidene inosine.

*Ip-HxR synthesized was hydrolized to HxR.

What we claim is:

1. A method of preparing a compound of the formula:

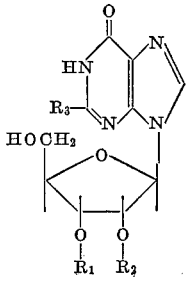

References Cited
UNITED STATES PATENTS 2,844,576   7/1958   Goldman et al. _____ 260—252

LEWIS GOTTS, *Primary Examiner.*

J. R. BROWN, *Assistant Examiner.*